(12) United States Patent
Isebrand

(10) Patent No.: US 10,203,253 B2
(45) Date of Patent: Feb. 12, 2019

(54) TOTAL AIR TEMPERATURE PROBE WITH EFFICIENT PARTICLE PASS THROUGH

(71) Applicant: Rosemount Aerospace Inc., Burnsville, MN (US)

(72) Inventor: Scott D. Isebrand, Minneapolis, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 143 days.

(21) Appl. No.: 15/040,627

(22) Filed: Feb. 10, 2016

(65) Prior Publication Data

US 2017/0227402 A1 Aug. 10, 2017

(51) Int. Cl.
*G01K 13/02* (2006.01)
*B64D 45/00* (2006.01)

(52) U.S. Cl.
CPC ........... *G01K 13/028* (2013.01); *B64D 45/00* (2013.01)

(58) Field of Classification Search
CPC .................................................. G01K 13/028
See application file for complete search history.

(56) References Cited

U.S. PATENT DOCUMENTS

| | | | | |
|---|---|---|---|---|
| 2,970,475 A | * | 2/1961 | Werner | G01K 13/02 374/135 |
| 5,653,538 A | * | 8/1997 | Phillips | G01K 13/02 374/135 |
| 5,752,674 A | | 5/1998 | Mears et al. | |
| 6,609,825 B2 | | 8/2003 | Ice et al. | |
| 6,651,515 B2 | | 11/2003 | Bernard | |
| 6,817,240 B2 | | 11/2004 | Collot et al. | |
| 6,840,672 B2 | | 1/2005 | Ice et al. | |
| 7,124,630 B2 | * | 10/2006 | Hanson | B64D 15/12 374/E13.006 |
| 7,150,560 B2 | | 12/2006 | Hanson et al. | |

(Continued)

FOREIGN PATENT DOCUMENTS

| | | |
|---|---|---|
| EP | 1992928 A2 | 11/2008 |
| EP | 2072981 A2 | 6/2009 |

(Continued)

OTHER PUBLICATIONS

Extended European Search Report for European Patent Application No. 17155028.8, dated Jul. 17, 2017, 9 pages.

(Continued)

*Primary Examiner* — Clayton E LaBalle
*Assistant Examiner* — Leon W Rhodes, Jr.
(74) *Attorney, Agent, or Firm* — Kinney & Lange, P.A.

(57) ABSTRACT

A total air temperature probe includes a housing having inner surfaces defining an airflow passage, a first section of the airflow passage of the housing having an airflow inlet scoop with a first cross-sectional area and an inertial separation bend downstream of the airflow inlet scoop, wherein the airflow passage is configured to be substantially straight; and a second section of the airflow passage of the housing having a main exit channel and an elongated outlet with a second cross-sectional area, wherein the airflow passage is contoured to direct particle deflections to the elongated outlet, wherein the second section is downstream from the first section, and wherein the first cross-sectional area is greater than the second cross-sectional area

18 Claims, 4 Drawing Sheets

(56) References Cited

U.S. PATENT DOCUMENTS

| | | | |
|---|---|---|---|
| 7,191,643 | B2 | 3/2007 | Rasmussen et al. |
| 7,357,572 | B2 | 4/2008 | Benning et al. |
| 7,441,948 | B2 | 10/2008 | Bernard et al. |
| 7,828,477 | B2 | 11/2010 | Benning et al. |
| 8,104,955 | B2 | 1/2012 | Benning et al. |
| 8,157,440 | B2 | 4/2012 | Kulczyk |
| 8,864,370 | B2 | 10/2014 | Dijon et al. |
| 2003/0058919 | A1 | 3/2003 | Ice et al. |
| 2006/0056489 | A1 | 3/2006 | Bernard et al. |
| 2016/0102562 | A1* | 4/2016 | Evans .................. F01D 5/187 416/95 |
| 2016/0238456 | A1 | 8/2016 | Wigen |
| 2017/0227402 | A1 | 8/2017 | Isebrand |
| 2017/0227404 | A1 | 8/2017 | Herman et al. |

FOREIGN PATENT DOCUMENTS

| | | | |
|---|---|---|---|
| EP | 2930492 | A2 | 10/2015 |
| EP | 2700925 | A2 | 2/2017 |
| WO | WO03050496 | A2 | 6/2003 |

OTHER PUBLICATIONS

Extended European Search Report for EP Application No. 18175038.1, dated Oct. 25, 2018, 7 Pages.

\* cited by examiner

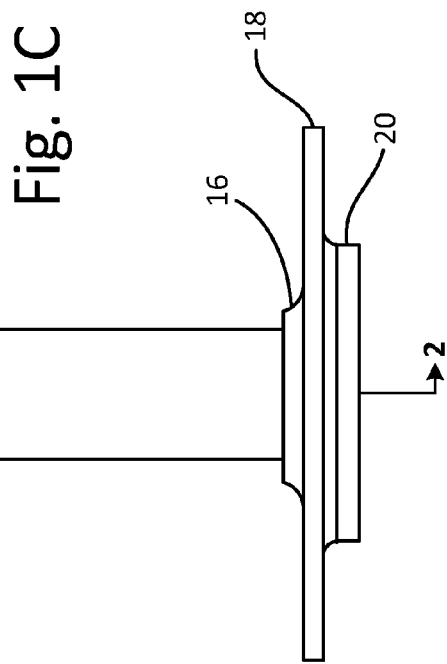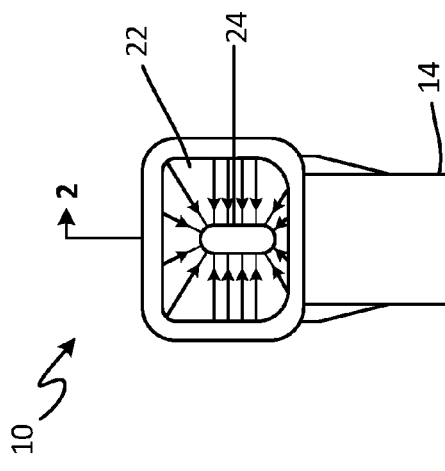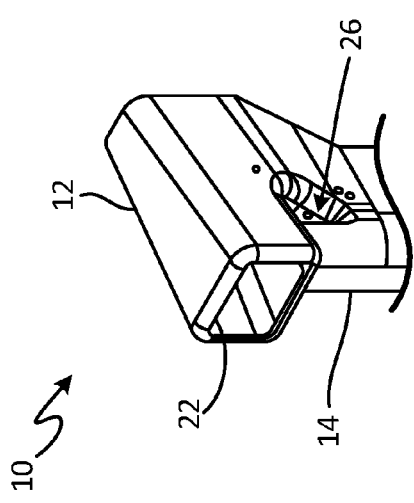

TOTAL AIR TEMPERATURE PROBE WITH EFFICIENT PARTICLE PASS THROUGH

BACKGROUND

Safe and efficient aircraft operation requires accurate temperature measurements. Total air temperature (TAT) probes, typically positioned outside the fuselage or at the engine inlet, measure the maximum air temperature attained by converting the kinetic energy of the surrounding airstream to thermal energy. TAT probes stagnate the surrounding free stream airflow to measure the static air temperature and the resulting adiabatic rise in temperature. Aircraft operators use this measurement and values derived therefrom for, among other things, true air speed calculations and fuel burn monitoring.

Icing conditions can be problematic for the accuracy of TAT measurements. During in flight icing conditions, solid particles, ice crystals, ice particles, and/or water droplets can accumulate on the sensing element within the probe, resulting in erroneous measurements. Conventional TAT probe designs use streamlined airflow passages and an inertial separation bump to prevent these particles from accumulating on the sensing element; however, these airflow geometries create impact surfaces for ingested particles. Impact surfaces cause deflection, fracturing, and small particle generation that increase the likelihood of accumulation on the sensing element and, as a result, measurement error. Additionally, more accurate TAT measurements may be necessary to meet rising aircraft cost and performance demands.

SUMMARY

In one embodiment, a total air temperature probe includes a housing having inner surfaces defining an airflow passage, a first section of the airflow passage of the housing having an airflow inlet scoop with a first cross-sectional area and an inertial separation bend downstream of the airflow inlet scoop, wherein the airflow passage is configured to be substantially straight; and a second section of the airflow passage of the housing having a main exit channel and an elongated outlet with a second cross-sectional area, wherein the airflow passage is configured to be contoured to direct particle deflections to the elongated outlet, wherein the second section is downstream from the first section, and wherein the first cross-sectional area is greater than the second cross-sectional area.

In another embodiment, a total air temperature probe includes a housing having inner surfaces defining an airflow passage, a strut connected to and configured to support the housing, a main exit channel formed in the housing, a mouth portion of the main exit channel having a first cross-sectional area defined by an upper portion of an inertial separation bend and a upper portion of a lower exit channel wall, and a throat portion of the of the main exit channel having a second cross-sectional area defined by a lower portion of the inertial separation bend and a lower portion of the lower exit channel wall, wherein the first cross-sectional area is greater than the second cross-sectional area.

BRIEF DESCRIPTION OF THE DRAWINGS

FIG. 1A is a front-facing perspective view of a total air temperature (TAT) probe.

FIG. 1B is a rear-facing perspective view of the TAT probe shown in FIG. 1A.

FIG. 1C is a front view of the TAT probe shown in FIG. 1A.

DETAILED DESCRIPTION

Figure 2:
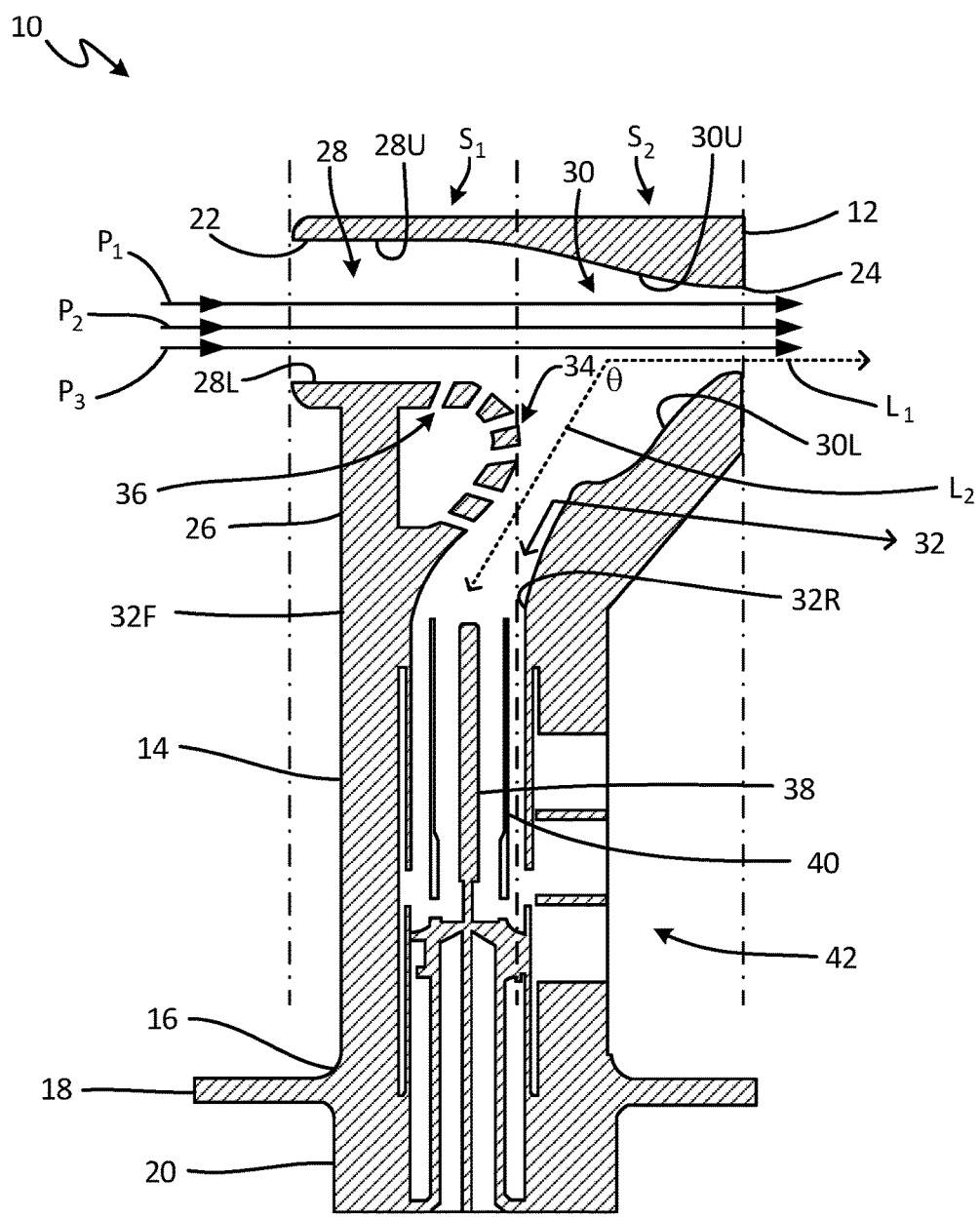
FIG. 2 is a cross-sectional view of the TAT probe showing particle trajectories therein, taken along line 2-2 of FIG. 1C.

FIG. 1A is a front-facing perspective view of total air temperature (TAT) probe 10. FIG. 1B is a rear-facing perspective view of TAT probe 10 shown in FIG. 1A. FIG. 1C is a front view of TAT probe 10 shown in FIG. 1A. TAT probe 10 includes housing 12, strut 14, mounting region 16, mounting flange 18, electronics housing 20, inlet scoop 22, elongated outlet 24, and external air passage 26. Housing 12 is connected to strut 14. Strut 14 is connected to housing 12 and mounting region 16. Mounting region 16 is connected to strut 14 and mounting flange 18. Mounting flange 18 is connected to mounting region 16 and electronics housing 20. Inlet scoop 22 is positioned at the front end of housing 12. Elongated outlet 24 is positioned at the rear end of housing 12. External air passage 26 is positioned between housing 12 and strut 14.

Housing 12 defines an airflow passage within TAT probe 10 having an inlet at inlet scoop 22 and an outlet at elongated outlet 24. Air enters TAT probe 10 at inlet scoop 22 and a portion of the entering air exits at elongated outlet 24. Elongated outlet 24 provides a larger outlet than conventional TAT probes to ensure that particles are expelled rather than deflected or fractured. Strut 14 supports housing 12 and connects to mounting region 16. Mounting region 16 connects strut 14 to mounting flange 18. Mounting flange 18 connects to electronics housing 20 and connects TAT probe 10 to the aircraft. Electronics housing 20 contains the electronic equipment.

FIG. 2 is a cross-sectional view TAT probe 10 taken along line 2-2 of FIG. 1C and showing airflow particle trajectories therein. TAT probe 10 includes housing 12, strut 14, mounting region 16, mounting flange 18, electronics housing 20, inlet scoop 22, elongated outlet 24, external air passage 26, airflow inlet channel 28 (which includes upper wall 28U and lower wall 28L), main air exit channel 30 (which includes upper exit channel wall 30U and lower exit channel wall 30L), sensor flow channel 32 (which includes front wall 32F and rear wall 32R), inertial separation bend 34, bleed ports 36, sensing element 38, sensing element housing 40, and exit ports 42. Also shown in FIG. 2 are sections $S_1$ and $S_2$; particle trajectories $P_1$, $P_2$, and $P_3$; airflow axis line $L_1$ and longitudinal axis line $L_2$; and angle $\theta$.

Housing 12 is connected to strut 14. Strut 14 is connected to housing 12 and mounting region 16. Mounting region 16 is connected to strut 14 and mounting flange 18. Mounting flange 18 is connected to mounting region 16 and electronics housing 20. Inlet scoop 22 is positioned at the front end of housing 12 in section $S_1$. Elongated outlet 24 is positioned at the rear end of housing 12 in section $S_2$.

Airflow inlet channel 28 is positioned within section $S_1$ of housing 12 and has a first end at inlet scoop 22 and a second end at inertial separation bend 34. Upper wall 28U of airflow inlet channel 28 is connected to inlet scoop 22 and upper exit channel wall 30U of main air exit channel 30. Lower wall 28L of airflow inlet channel 28 is connected to inlet scoop 22 and inertial separation bend 34. Inertial separation bend 34 is positioned within section $S_1$ of housing 12 and is connected to external air passage 26, lower wall 28L, and front wall 32F of sensor flow channel 32. Bleed ports 36 are positioned within inertial separation bend 34. External air passage 26 is positioned between housing 12 and strut 14 and is connected to housing 12, strut 14, inertial separation bend 34, and bleed ports 36.

Main air exit channel 30 is positioned within section $S_2$ of housing 12 and has a first end at inertial separation bend 34 and a second end at elongated outlet 24. Upper exit channel wall 30U of main air exit channel 30 is connected to elongated outlet 24 and upper wall 28U. Lower exit channel wall 30L of main air exit channel 30 is connected to elongated outlet 24 and rear wall 32R of sensor flow channel 32.

Sensor flow channel 32 is positioned at the lower end of inertial separation bend 34 and at the lower end of lower exit channel wall 30L. Front wall 32F of sensor flow channel 32 is connected to inertial separation bend 34. Rear wall 32R of sensor flow channel 32 is connected to lower exit channel wall 30L of main air exit channel 30. The upper portion of sensor flow channel 32 is positioned generally along longitudinal axis line $L_2$. Longitudinal axis line $L_2$ forms angle $\theta$ with airflow axis line $L_1$, which represents the direction of travel of free stream airflow. In one embodiment, angle $\theta$ can be 120 degrees. Sensing element 38 and sensor housing 40 are positioned within sensor flow channel 32. Exit ports 42 are positioned in strut 14 and are connected to sensor flow channel 32.

Free stream airflow enters TAT probe 10 at inlet scoop 22 and proceeds along airflow inlet channel 28 to inertial separation bend 34. Inertial separation bend 34 separates the airflow from airflow inlet channel 28 so that one portion of the airflow proceeds to main air exit channel 30 and another portion of the airflow continues to sensor flow channel 32. The portion of the airflow proceeding to main air exit channel 30 is then expelled from elongated outlet 24. The portion of the airflow entering sensor flow channel 32 engages with sensing element 38. The temperature of this airflow portion can be measured by sensing element 38 before being expelled from TAT probe 10 at exit ports 42.

In section $S_1$ of TAT probe 10, free stream air enters inlet scoop 22 and proceeds along airflow inlet channel 28 to inertial separation bend 34. Upper wall 28U and lower wall 28L of airflow inlet channel 28 are configured to be substantially parallel. Inertial separation bend 34 remains substantially flat with respect to lower wall 28L, rather than ramping toward upper wall 28U or acting as an air bump. This airflow geometry in section $S_1$ ensures that any solid particles, ice crystals, or ice particles entering airflow inlet channel 28 are less likely to deflect or fracture because there are fewer impact surfaces, while also separating the airflow path to proceed to main air exit channel 30 and sensor flow channel 32. Minimizing deflections and fractures of these particles decreases the likelihood of particle accretion on sensing element 38 of TAT probe 10, thereby decreasing the likelihood of temperature measurement error. Particle trajectories $P_1$, $P_2$, and $P_3$ illustrate efficient particle pass through for TAT probe 10, avoiding collision with any of the internal surfaces of airflow inlet channel 28 in section $S_1$.

In section $S_2$ of TAT probe 10, inertial separation bend 34 diverts one portion of the airflow from airflow inlet channel 28 to main air exit channel 30 and another portion to sensor flow channel 32. Upper exit channel wall 30U and lower exit channel wall 30L of main exit channel 30 are contoured to direct particle deflections to elongated outlet 24. The cross-sectional area defined by upper exit channel wall 30U and lower exit channel wall 30L decreases in the direction of elongated outlet 24. The cross-sectional area defined by inertial separation bend 34 and lower exit channel wall 30L decreases in the direction of mounting flange 18 until reaching wall the upper portion of rear wall 32R. The geometry of upper exit channel wall 30U and lower exit channel wall 30L directs particle deflections to elongated outlet 24. This geometry also ensures that there is proper restriction on elongated outlet 24 and air stagnation in main air exit channel 30 to facilitate separation of the airflow at inertial separation bend 34. As in Section $S_1$, particle trajectories $P_1$, $P_2$, and $P_3$ avoid collision with any of the internal surfaces of main air exit channel 30 in section $S_2$. The airflow geometries of sections $S_1$ and $S_2$ minimize the likelihood of particle deflections and fracturing and, thus, temperature measurement error in TAT probe 10.

Figures 3A, 3B:
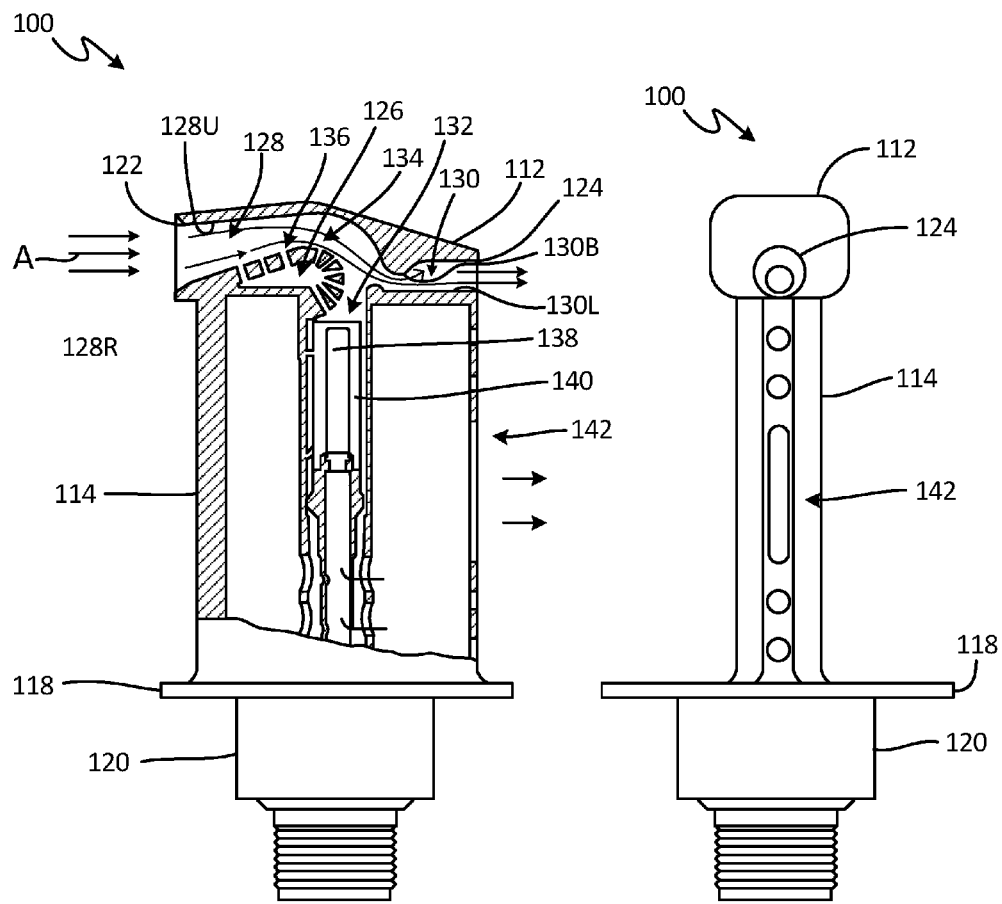
FIG. 3A is a partial cut away view of a prior art TAT probe.
FIG. 3B is a rear view of the prior art TAT probe in FIG. 4A.

FIG. 3A is a partial cut away view of prior art TAT probe 100. FIG. 3B is a rear view of prior art TAT probe 100 in FIG. 3A. Prior art TAT probe 100 includes housing 112, strut 114, mounting flange 118, electronics housing 120, inlet scoop 122, outlet 124, external air passage 126, airflow inlet channel 128 (which includes upper wall 128U and inlet flow ramp 128R), main air exit channel 130 (which includes air bump 130B and lower exit channel wall 130L), sensor flow channel 132, inertial separation bump 134, bleed ports 136, sensing element 138, sensing element housing 140, and exit ports 142. Also included in FIG. 3A is free stream airflow A.

Housing 112 is connected to strut 114. Strut 114 is connected to housing 112 and mounting flange 118. Mounting flange 118 is connected to strut 114 and electronics housing 120. Inlet scoop 122 is positioned at the front end of housing 112. Outlet 124 is positioned at the rear end of housing 112. Airflow inlet channel 128 is positioned within housing 112 and has a first end at inlet scoop 122 and a second end at inertial separation bump 134. Upper wall 128U of airflow inlet channel 128 is connected to inlet scoop 122 and air bump 130B of main air exit channel 130. Inlet flow ramp 128R of airflow inlet channel 128 is connected to inlet scoop 122 and to inertial separation bump 134. Inertial separation bump 134 is positioned within housing 112 and is connected to inlet flow ramp 128R. Bleed ports 136 are positioned within inertial separation bump 134. External air passage 126 is positioned between housing 112 and strut 114 and is connected to housing 112, strut 114, inertial separation bump 134, and bleed ports 136. Main air exit channel 130 is positioned within housing 112 and has a first end at inertial separation bump 134 and a second end at outlet 124. Air bump 130B of main air exit channel 130 is connected to outlet 124 and upper wall 128U. Lower lip 130L of main air exit channel 130 is connected to outlet 124 and sensor flow channel 132. Sensor flow channel 132 is positioned at the lower end of inertial separation bump 134 and at lower lip 130L of main air exit channel 130. Sensing element 138 and sensor housing 140 are positioned within sensor flow channel 132. Exit ports 142 are positioned in strut 114 and are connected to sensor flow channel 132.

Free stream airflow A enters prior art TAT probe 100 at inlet scoop 122 and proceeds along airflow inlet channel 128 to inertial separation bump 134. Both lower inlet flow ramp 128R and inertial separation bump 134 angle upward toward upper inlet flow wall 28U, constricting airflow A in airflow inlet channel 128. Inertial separation bump 134 separates airflow A so that one portion of airflow A proceeds to main air exit channel 130 and another portion of airflow A continues to sensor flow channel 132. The portion of airflow A proceeding to main air exit channel 130 travels around air bump 130B and over lower lip 130L and is then expelled from outlet 124. The portion of airflow A entering sensor flow channel 132 engages with sensing element 138. The temperature of this airflow portion can be measured by sensing element 138 before being expelled from TAT probe 100 at exit ports 142. Airflow A is constricted as airflow inlet channel 128 narrows and at air bump 130B in main air exit channel 130.

Figures 4A, 4B:
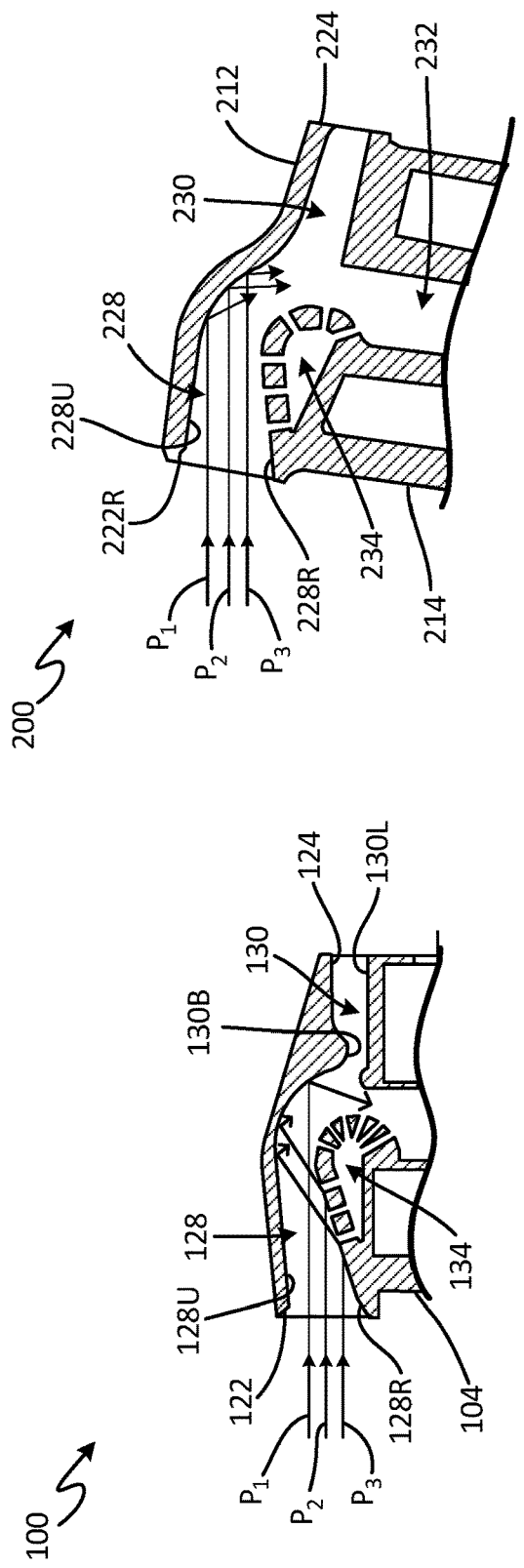
FIG. 4A is a cross-sectional view of the prior art TAT probe of FIGS. 3A and 3B showing particle trajectories therein.
FIG. 4B is a cross-sectional view of a second prior art TAT probe showing particle trajectories therein.

FIG. 4A is a cross-sectional view of prior art TAT probe 100 shown in in FIGS. 3A and 3B including particle trajectories therein. Prior art TAT probe 100 includes housing 112, strut 114, inlet scoop 122, outlet 124, airflow inlet channel 128 (which includes upper wall 128U and inlet flow ramp 128R), main air exit channel 130 (which includes air bump 130B and lower exit channel wall 130L), sensor flow channel 132, and inertial separation bump 134. Also included in FIG. 4A are particle trajectories $P_1$, $P_2$, and $P_3$. As illustrated by particle trajectories $P_1$, $P_2$, and $P_3$, inlet flow ramp 128R, inertial separation bump 134, air bump 130B, and over lower lip 130L can act is impact surfaces for solid particles, ice crystals, or ice particles causing deflection and fracturing thereof. Particle trajectory $P_1$ collides with air bump 130B and deflects toward the sensing element. Particle trajectories $P_2$ and $P_3$ strike and deflect from inertial separation bump 134 and upper wall 128U. Such collisions increase the likelihood of particles accumulating at the sensing element.

FIG. 4B is a cross-sectional view of prior art TAT probe 200 showing particle trajectories therein. Prior art TAT probe 200 includes housing 212, strut 214, inlet scoop 222, outlet 224, airflow inlet channel 228 (which includes upper wall 228U and lower wall 228L), main air exit channel 230 (which includes upper exit channel wall 230U and lower exit channel wall 230L), sensor flow channel 232, and inertial separation bump 234. Free stream airflow enters prior art TAT probe 200 at inlet scoop 222 and directed along airflow inlet channel 228 to inertial separation bump 234. Both lower inlet flow ramp 228R and inertial separation bump 234 ramp upward toward upper inlet flow wall 228U. Inertial separation bump 234 separates the airflow from airflow inlet channel 228 so that one portion of the airflow proceeds to main air exit channel 230 and another portion of the airflow continues to sensor flow channel 232. Particle trajectories $P_1$, $P_2$, and $P_3$ illustrate that upper wall 228U can act as impact surfaces for solid particles, ice crystals, or ice particles causing deflection and fracturing thereof. Particle trajectories $P_1$, $P_2$, and $P_3$ strike and collide with upper exit channel wall 230U and deflect in in the direction of sensor flow channel 232, increasing the likelihood of measurement error due to particle accretion at the sensing element.

Discussion of Possible Embodiments

The following are non-exclusive descriptions of possible embodiments of the present invention.

A total air temperature probe according to an exemplary embodiment of this disclosure, among other possible things, includes a housing having inner surfaces defining an airflow passage, a first section of the airflow passage of the housing having an airflow inlet scoop with a first cross-sectional area and an inertial separation bend downstream of the airflow inlet scoop, wherein the airflow passage is configured to be substantially straight, and a second section of the airflow passage of the housing having a main exit channel and an elongated outlet with a second cross-sectional area, wherein the airflow passage is contoured to direct particle deflections to the elongated outlet, wherein the second section is downstream from the first section, and wherein the first cross-sectional area is greater than the second cross-sectional area.

The total air temperature probe of the preceding paragraph can optionally include, additionally and/or alternatively, any one or more of the following features, configurations and/or additional components:

The total air temperature probe further comprising a strut connected to and configured to support the housing, a sensor flow passage formed in the strut, and a total air temperature sensor positioned in the sensor flow passage.

The total air temperature probe wherein a portion of the sensor flow passage extends longitudinally along an axis, that is oriented to form an angle θ with the airflow passage of the first section.

The total air temperature probe wherein the angle θ is between 115 and 145 degrees.

The total air temperature probe wherein the total air temperature sensor is configured to measure a total air temperature of an airflow through the sensor flow passage.

The total air temperature probe wherein the total air temperature probe is mounted to an aircraft surface.

The total air temperature probe wherein the elongated outlet is obround.

A total air temperature probe includes a housing having inner surfaces defining an airflow passage, a strut connected to and configured to support the housing, a main exit channel formed in the housing, a mouth portion of the main exit channel having a first cross-sectional area defined by an upper portion of an inertial separation bend and a upper portion of a lower exit channel wall, and a throat portion of the of the main exit channel having a second cross-sectional area defined by a lower portion of the inertial separation bend and a lower portion of the lower exit channel wall, wherein the first cross-sectional area is greater than the second cross-sectional area.

The total air temperature probe of the preceding paragraph can optionally include, additionally and/or alternatively, any one or more of the following features, configurations and/or additional components:

The total air temperature probe further comprising an inertial separation bend within the airflow passage.

The total air temperature probe further comprising an external air passage.

The total air temperature probe wherein the inertial separation bend includes bleed ports.

The total air temperature probe wherein the external air passage is configured to be in fluid connection with the bleed ports and the inertial separation bend.

The total air temperature probe wherein the lower exit channel wall and an upper exit channel wall of the main exit channel are contoured to direct particles to an elongated outlet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A total air temperature probe comprising:
a strut;
a housing defining an airflow passage, the housing having an inlet, an outlet, and an inertial separation bend, a lower end of the housing being connected to the strut;
an airflow inlet channel positioned within a first section of the housing and having a first end at the inlet and a second end at the inertial separation bend downstream of the inlet, the airflow inlet channel including:
  an upper wall; and
  a lower wall having a first end connected to the inlet and a second end connected to the inertial separation bend;
a sensor flow channel positioned at a lower end of the inertial separation bend and extending to exit ports; and
a main air exit channel positioned within a second section of the housing downstream from the first section and having a first end at the inertial separation bend and a second end at the outlet, the main air exit channel including:
  an upper exit channel wall having a first end connected to the upper wall of the airflow inlet channel and a second end connected to the outlet; and
  a lower exit channel wall having a first end connected to a rear wall of the sensor flow channel and a second end connected to the outlet;
wherein the upper wall and the lower wall of the airflow inlet channel are configured to be substantially parallel, and an upper portion of the inertial separation bend remains substantially flat with respect to the lower wall; and
wherein a cross-sectional area defined by the upper exit channel wall and the lower exit channel wall decreases in the direction of the outlet.

2. The total air temperature probe of claim 1, further comprising:
a total air temperature sensor positioned in the sensor flow channel.

3. The total air temperature probe of claim 1, wherein a portion of the sensor flow channel extends longitudinally along an axis that is oriented to form an angle θ with the airflow inlet channel.

4. The total air temperature probe of claim 3, wherein the angle θ is between 115 and 145 degrees.

5. The total air temperature probe of claim 4, wherein the total air temperature sensor is configured to measure a total air temperature of an airflow through the sensor flow channel.

6. The total air temperature probe of claim 5, wherein the total air temperature probe is mounted to an aircraft surface.

7. The total air temperature probe of claim 1, wherein the outlet is obround.

8. The total air temperature probe of claim 1, wherein the lower exit channel wall and the upper exit channel wall of the main exit channel are contoured to direct particles to the outlet and facilitate separation of airflow at the inertial separation bend.

9. A total air temperature probe comprising:
a strut;
a housing defining an airflow passage, the housing connected to the strut;
an inlet positioned at a front end of the housing;
an outlet positioned at a rear end of the housing;
an inertial separation bend within the airflow passage between the inlet and the outlet;
an airflow inlet channel having a first end at the inlet and a second end at the inertial separation bend, the airflow inlet channel including:
  an upper wall; and
  a lower wall;
a main exit channel having a first end at the inertial separation bend and a second end at the outlet, the main exit channel including:
  an upper exit channel wall; and
  a lower exit channel wall; and
a sensor flow channel positioned at a lower end of the inertial separation bend and at a lower end of the lower exit channel wall, a portion of the sensor flow channel extending longitudinally along an axis that is oriented to form an angle θ with the airflow inlet channel;
wherein the upper wall of the airflow inlet channel is connected to the inlet and the upper exit channel wall of the main exit channel, the lower wall of the airflow inlet channel is connected to the inlet and the inertial separation bend, and the upper wall and the lower wall are substantially parallel; and
wherein an upper portion of the inertial separation bend remains substantially flat with respect to the lower wall of the airflow inlet channel.

10. The total air temperature probe of claim 9, wherein the inertial separation bend includes bleed ports.

11. The total air temperature probe of claim 10, further comprising an external air passage positioned between the housing and the strut and connected to the inertial separation bend.

12. The total air temperature probe of claim 11, wherein the external air passage is configured to be in fluid connection with the bleed ports and the inertial separation bend.

13. The total air temperature probe of claim 9, wherein the lower exit channel wall and the upper exit channel wall of the main exit channel are contoured to direct particles to the outlet and facilitate separation of airflow at the inertial separation bend.

14. The total air temperature probe of claim 9, further comprising a total air temperature sensor positioned in the sensor flow channel.

15. The total air temperature probe of claim 14, wherein the total air temperature sensor is configured to measure a total air temperature of an airflow through the sensor flow channel.

16. The total air temperature probe of claim 9, wherein the angle θ is between 115 and 145 degrees.

17. The total air temperature probe of claim 9, wherein the total air temperature probe is mounted to an aircraft surface.

18. The total air temperature probe of claim 9, wherein the outlet is obround.

* * * * *